US007882317B2

(12) United States Patent
Hunt et al.

(10) Patent No.: US 7,882,317 B2
(45) Date of Patent: Feb. 1, 2011

(54) PROCESS ISOLATION USING PROTECTION DOMAINS

(75) Inventors: Galen C. Hunt, Bellevue, WA (US); Chris K. Hawblitzel, Redmond, WA (US); James R. Larus, Mercer Island, WA (US); Manuel A. Fahndrich, Seattle, WA (US); Mark Aiken, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 368 days.

(21) Appl. No.: 11/462,556

(22) Filed: Aug. 4, 2006

(65) Prior Publication Data

US 2008/0141266 A1   Jun. 12, 2008

Related U.S. Application Data

(63) Continuation-in-part of application No. 11/005,562, filed on Dec. 6, 2004.

(51) Int. Cl.
*G06F 12/00* (2006.01)
(52) U.S. Cl. .................. 711/163; 711/150; 711/152; 711/E12.091; 711/E12.095; 711/E12.097
(58) Field of Classification Search .............. 711/152
See application file for complete search history.

(56) References Cited

U.S. PATENT DOCUMENTS

| 4,916,637 | A |   | 4/1990  | Allen et al. |
| 5,057,996 | A |   | 10/1991 | Cutler et al. |
| 5,361,359 | A |   | 11/1994 | Tajalli et al. |
| 5,367,681 | A |   | 11/1994 | Foss et al. |
| 5,455,951 | A |   | 10/1995 | Bolton et al. |
| 5,469,571 | A |   | 11/1995 | Bunnell |
| 5,481,717 | A |   | 1/1996  | Gaboury |
| 5,522,075 | A | * | 5/1996  | Robinson et al. ............ 718/100 |
| 5,551,051 | A |   | 8/1996  | Silverthorn et al. |
| 5,574,911 | A |   | 11/1996 | D'Angelo et al. |
| 5,590,001 | A |   | 12/1996 | Ino et al. |
| 5,737,605 | A |   | 4/1998  | Cunningham et al. |

(Continued)

FOREIGN PATENT DOCUMENTS

CN          1549108(A)          11/2004

(Continued)

OTHER PUBLICATIONS

Chiueh, et al., "Integrating segmentation and paging protection for safe, efficient and transparent software extensions", SOSP-17, ACM, Dec. 1999, pp. 140-153.

(Continued)

*Primary Examiner*—Reginald G Bragdon
*Assistant Examiner*—Aracelis Ruiz
(74) *Attorney, Agent, or Firm*—Lee & Hayes, PLLC

(57) ABSTRACT

A first plurality of operating system processes is assigned to a first protection domain, and a second plurality of operating system processes is assigned to a second protection domain. One or more hardware protection mechanisms are used to prevent the first plurality of operating system processes from accessing the memory space of the second plurality of operating system processes, and also to prevent the second plurality of operating system processes from accessing the memory space of the first plurality of operating system processes.

20 Claims, 4 Drawing Sheets

U.S. PATENT DOCUMENTS

| | | | |
|---|---|---|---|
| 5,752,032 A | 5/1998 | Keller et al. | |
| 5,768,532 A | 6/1998 | Megerian | |
| 5,794,052 A | 8/1998 | Harding | |
| 5,845,129 A * | 12/1998 | Wendorf et al. | 710/200 |
| 5,857,195 A | 1/1999 | Hayashi et al. | |
| 5,878,408 A | 3/1999 | Van Huben et al. | |
| 5,931,938 A | 8/1999 | Drogichen et al. | |
| 5,938,723 A | 8/1999 | Hales, II et al. | |
| 5,958,050 A | 9/1999 | Griffin et al. | |
| 5,963,743 A | 10/1999 | Amberg et al. | |
| 5,974,572 A | 10/1999 | Weinberg et al. | |
| 5,991,518 A | 11/1999 | Jardine et al. | |
| 6,006,328 A | 12/1999 | Drake | |
| 6,009,476 A | 12/1999 | Flory et al. | |
| 6,038,399 A | 3/2000 | Fisher et al. | |
| 6,066,182 A | 5/2000 | Wilde et al. | |
| 6,072,953 A | 6/2000 | Cohen et al. | |
| 6,080,207 A | 6/2000 | Kroening et al. | |
| 6,092,189 A | 7/2000 | Fisher et al. | |
| 6,115,819 A | 9/2000 | Anderson | |
| 6,144,992 A | 11/2000 | Turpin et al. | |
| 6,157,928 A | 12/2000 | Sprenger et al. | |
| 6,161,051 A | 12/2000 | Hafemann et al. | |
| 6,182,275 B1 | 1/2001 | Beelitz et al. | |
| 6,202,147 B1 | 3/2001 | Slaughter et al. | |
| 6,247,128 B1 | 6/2001 | Fisher et al. | |
| 6,279,111 B1 | 8/2001 | Jensenworth et al. | |
| 6,292,941 B1 | 9/2001 | Jollands | |
| 6,321,334 B1 | 11/2001 | Jerger et al. | |
| 6,324,622 B1 | 11/2001 | Okpisz et al. | |
| 6,351,850 B1 | 2/2002 | van Gilluwe et al. | |
| 6,381,742 B2 | 4/2002 | Forbes et al. | |
| 6,405,361 B1 | 6/2002 | Broy et al. | |
| 6,434,694 B1 | 8/2002 | Slaughter et al. | |
| 6,438,549 B1 | 8/2002 | Aldred et al. | |
| 6,442,754 B1 | 8/2002 | Curtis | |
| 6,446,260 B1 | 9/2002 | Wilde et al. | |
| 6,487,723 B1 | 11/2002 | MacInnis | |
| 6,546,546 B1 | 4/2003 | Van Doorn | |
| 6,629,152 B2 | 9/2003 | Kingsbury et al. | |
| 6,658,447 B2 | 12/2003 | Cota-Robles | |
| 6,732,220 B2 | 5/2004 | Babaian et al. | |
| 6,748,592 B1 | 6/2004 | Porter | |
| 6,816,905 B1 | 11/2004 | Sheets et al. | |
| 6,842,782 B1 | 1/2005 | Malik et al. | |
| 6,868,539 B1 | 3/2005 | Travison et al. | |
| 6,912,692 B1 | 6/2005 | Pappas | |
| 6,977,994 B2 | 12/2005 | Stephenson et al. | |
| 6,988,261 B2 | 1/2006 | Sokolov et al. | |
| 7,062,764 B2 | 6/2006 | Cohen et al. | |
| 7,086,056 B2 | 8/2006 | Fukushima | |
| 7,089,289 B1 | 8/2006 | Blackmore et al. | |
| 7,155,713 B1 | 12/2006 | Burkhardt et al. | |
| 7,167,867 B1 | 1/2007 | Rago | |
| 7,222,106 B2 | 5/2007 | Block et al. | |
| 7,222,341 B2 | 5/2007 | Forbes et al. | |
| 7,278,030 B1 * | 10/2007 | Chen et al. | 713/189 |
| 7,454,477 B2 | 11/2008 | Talluri et al. | |
| 7,484,245 B1 | 1/2009 | Friedman et al. | |
| 7,600,232 B2 | 10/2009 | Hunt et al. | |
| 2001/0029605 A1 | 10/2001 | Forbes et al. | |
| 2002/0004852 A1 | 1/2002 | Sadovsky et al. | |
| 2002/0099954 A1 | 7/2002 | Kedma et al. | |
| 2002/0100017 A1 | 7/2002 | Grier et al. | |
| 2003/0031404 A1 | 2/2003 | Pedersen | |
| 2003/0061404 A1 | 3/2003 | Atwal et al. | |
| 2003/0084256 A1 * | 5/2003 | McKee | 711/152 |
| 2003/0097581 A1 | 5/2003 | Zimmer | |
| 2003/0130854 A1 | 7/2003 | Galanes et al. | |
| 2003/0191867 A1 * | 10/2003 | Czajkowski | 709/315 |
| 2003/0200402 A1 | 10/2003 | Willman et al. | |
| 2003/0212990 A1 | 11/2003 | Brodkorb et al. | |
| 2003/0233644 A1 | 12/2003 | Cohen et al. | |
| 2004/0025016 A1 | 2/2004 | Focke et al. | |
| 2004/0034850 A1 | 2/2004 | Burkhardt et al. | |
| 2004/0061067 A1 | 4/2004 | Clauss | |
| 2004/0064736 A1 | 4/2004 | Obrecht et al. | |
| 2004/0078799 A1 | 4/2004 | Koning et al. | |
| 2004/0123273 A1 | 6/2004 | Hammerich et al. | |
| 2004/0153991 A1 | 8/2004 | Chen et al. | |
| 2004/0187096 A1 | 9/2004 | Dumont | |
| 2004/0193819 A1 | 9/2004 | Marinescu et al. | |
| 2004/0199763 A1 | 10/2004 | Freund | |
| 2004/0226023 A1 | 11/2004 | Tucker | |
| 2004/0236861 A1 | 11/2004 | Bondar et al. | |
| 2005/0005261 A1 | 1/2005 | Severin | |
| 2005/0021537 A1 | 1/2005 | Brendle et al. | |
| 2005/0050069 A1 | 3/2005 | Vaschillo et al. | |
| 2005/0060687 A1 | 3/2005 | Ghazaleh et al. | |
| 2005/0071592 A1 * | 3/2005 | DeCaro | 711/163 |
| 2005/0091658 A1 | 4/2005 | Kavalam et al. | |
| 2005/0119902 A1 | 6/2005 | Christiansen | |
| 2005/0223239 A1 | 10/2005 | Dotan | |
| 2005/0246718 A1 | 11/2005 | Erlingsson et al. | |
| 2006/0031815 A1 | 2/2006 | Bhagia et al. | |
| 2006/0069692 A1 | 3/2006 | Pernia | |
| 2006/0085789 A1 | 4/2006 | Laborczfalvi et al. | |
| 2007/0256080 A1 | 11/2007 | Smith et al. | |

FOREIGN PATENT DOCUMENTS

| | | |
|---|---|---|
| EP | 1033648(A2) | 9/2000 |
| EP | 1443398 A | 8/2004 |
| KR | 20010007119 | 1/2001 |
| WO | WO02093370 A | 11/2002 |
| WO | WO03038599 A2 | 5/2003 |

OTHER PUBLICATIONS

Engler et al.; "Exokernal: an Operating System Architecture for Application-Level Resource Management"; In Proceedings of the Fifteenth ACM Symposium on Operating System Principles, Cooper Mountain Resort, Co, 1995, pp. 251-266, Dec. 1995.

Hartig et al.; "The performance of u-kernal-based Systems"; In Proceedings of the Sixteenth ACM Symposium on Operating Systems Principles (SOSP '97), Saing Malo, France, 1997, pp. 66-77, Oct. 1997.

Hawblitzel et al.; "Implementing Multiple PRotection Domains in Java"; In Proceedings of the 1998 USENIX Annual Technical Conference, New Orleans, LA, 1998, pp. 259-270, Jun. 1998.

"JSR-000121 Application Isolation API Specification"; available at http://jcp.org/aboutJava/communityprocess/pfd/jsr121/index.html; printed Sep. 7, 2005, 1 page.

"JSR 121: Application Isolation API Specification" Java Specification Requests, printed Sep. 7, 2006, 7 pages.

Redell et al.; "Pilot An Operating System for a Personal Computer"; Communications of the ACM, 23(2), 1980, pp. 81-92, Feb. 1980.

Rosenblum et al.; "The Impact of Architectural Trends on Operating System Performance"; In Proceedings of the Fifteenth ACM Symposium on Operating System Principles, Copper Mountain Resort, CO, 1995, pp. 285-298, Dec. 1995.

Skousen, et al., "Resource Access and Protection in the Sombrero Protection Model, Software Protection Data Structures and Hardware Range Protection Lookaside Buffer", ASU 64-bit OS Group White Paper 2, Technical Report, TR-95-013, Jan. 1996, 35 pages.

Swift et al; "Improving the Reliability of Commodity Operating Systems"; In Proceedings of the 19th ACM Symposium on Operating Systems Principles (SOSP '03), Bolton Landing, NY, 2003, pp. 207-222, Oct. 2003.

Swinehart et al.; "A Structural View of the Cedar Programming Environment"; ACM Transactions on Programming Languages and Systems, 8(4), 1986, pp. 419-490, Oct. 1986.

Acceta et al.; "A New Kernel Foundation for UNIX Development", in Summer USENIX Conference, Atlanta, GA, Jun. 1986, pp. 93-112.

Back et al.; "Processes in KaffeOS: Isolation, Resources Management, and Sharing in Java"; In Proceedings of the 4th USENIX Symposium on Operating Systems Design & Implementation (OSDI), San Diego, CA, Oct. 2000.

Dorward et al; "The Inferno Operating System"; Bell Labs Technical Journal, 2 (1), Winter 1997, pp. 5-18.

Goldberg et al.; "Smalltalk-80: The Language and Its Implementation"; Addison-Wesley, May 1983.

Golm et al.; "The JX Operating System"; In Proceedings of the USENIX 2002 Annual Conference, Monterey, CA, Jun. 2002, pp. 45-58.

Hawblitzel et al.; "Luna: A Flexible Java Protection System"; In Proceedings of the Fifth ACM Symposium on Operating System Design and Implementation (OSDI'02), Boston, MA, Dec. 2002, pp. 391-402.

Rajamani et al.; "Conformance Checking for Models of Asynchronous Message Passign Software"; In Proceedings of the International Conference on Computer Aided Verification (CAV 02), Springer, Copenhagen, Denmark, Jul. 2002, pp. 166-179.

Wahbe, et al., "Efficient Software-Based Fault Isolation", Proceedings of the Symposium on Operating System Principles, Dec. 1993, 14 pages.

Weinreb et al.; "Lisp Machine Manuel"; Symbolics, Inc., Cambridge, MA, Jul. 1981.

Wood et al.; "An In-Cache Address Translation Mechanism"; In Proceedings of the Thirteenth Annual International Symposium on Computer Architecture, Jun. 1986, pp. 158-166.

Acharya, et al., "MAPbox: Using Parameterized Behavior Classes to Confine Applications", University of California, Santa Barbara, May 1, 1999, pp. 1-19.

Bogojevic, et al., "The Architecture of Massive Multiplayer Online Games", retrieved on Feb. 25, 2009 at <<http://graphics.cs.lth.se/theses/projects/mmogarch/som.pdf>>, Department of Computer Science, Lund University, Sep. 8, 2003, Chapter 4, 11 pages.

Chaki et al, "Types as Models: Model Checking Message-Passing Programs", Proceedings of the 29th ACM Symposium on Principles of Programing Lanuages, Jan. 2002, pp. 45-57.

Fraim, "Scomp: A Solution to the Multilevel Security Problem", IEEE, vol. 16, No. 7, Jul. 1983, pp. 26-34.

Golm et al., "Beyond Address Spaces-Flexibility, Preformance, Protection, and Resource Management in the Tpe-Safe JX Operatin System", Proc. of the 8th Workshop on Hot Topics in Operating Systems, May 2001, pp. 1-6.

Hunt et al: "Broad New OS Research: Challenges and Opportunities" Retrieved from the Internet: URL:http://research.microsoft.com/os/singularity/publications/hotos2005_broadnewreseach.pdf> [retrieved on Dec. 2, 2008].

Hunt et al., "Singularity Technical Report 1: Singularity Design Motivation", Microsoft Research, Microsoft Corporation, Dec. 17, 2004, 5 pages.

Kurchuk, et al., "Recursive Sandboxes: Extending Systrace to Empower Applications", retrieved on Sep. 4, 2009 at <<http://web.archive.org/web/20040725140723/http://nsl.cs.columbia.edu/projects/grid/lock/systrace_extensions.pdf>>, pp. 1-16, Aug. 2004.

McNamee et al., "An Attribute Grammar Approach to Compiler Optimization of Intra-Module Interprocess Communication", International Journal of Parallel Programming, vol. 20, Nov. 3, 1991, pp. 181-202.

"Microsoft Computer Dictionary", retrieved on Sep. 4, 2009 at <<http://proquest.safaribooksonline.com/print?xmlid=0735614954/ch20>>, Fifth Edition, pp. 1-2, May 2002.

"Microsoft Press Computer Dictionary, Second Edition", Redmond, WA, USA, 1994, pp. 23-24 and p. 279, Sep. 1994.

"Microsoft Press Computer Dictionary, Third Edition", Redmond WA, USA, 3 pages, Sep. 1997.

Mikunov A., "Rewrite MSil Code on the Fly with the .NET Framework Profiling API", MSDN Magazine (Online) Sep. 2003, Retrieved from the Internet: URL: <<http://msdn.microsoft.com/en-us/magazine/cc188743(printer).aspx>> retrieved onDec. 12, 2008).

Perrine, et al., "An Overview of the Kernelized Secure Operating System (KSOS)", Proceedings of the 7th DoD/NBS Computer Security Conference, Sep. 1984, pp. 0-14.

Perrine, "The Kernelized Secure Operating System (KSOS)", ;login: The Magazine of USENIX & SAGE, vol. 27, No. 6, Dec. 2002, pp. 37-40.

Pike, et al, "The Use of Name Spaces in Plan 9", Operating Systems Review, vol. 27, #2, Apr. 1993, pp. 72-76.

Provos, "Improving Host Security with System Call Policies", Proceedings of the 12th USENIX Security Symposium, USENIX Association, Aug. 2003, pp. 257-271.

Tanenbaum, "Modern Operating Systems, Second Edition", Prentice Hall, Upper Saddle River, NJ, USA, 2001, pp. 168-170 and pp. 174-175, Feb. 2001.

Tatsubori et al: "Open Java: A Class-Based Macro System for Java" 2000 [Retrieved from the Internet: URL: http://www.springerlink.com/content/n64gdultayqfmcjc/fulltext.pdf> [retrieved on Dec. 2, 2008], Jun. 2000.

Tost, "Loosely typed versus strongly typed Web services", Sep. 2, 2005, IDM, pp. 1-14.

"Trademark Electronic Search System (TESS) from the USPTO database" for "WINDOWS" trademark of Microsoft filed in USPTO Aug. 20, 1999; http://tess2.uspto.gov/bin/gate.exe? f=doc &state=n00gan.5.26.

"Variable Scope", retrieved on Aug. 20, 2009 at <<http://irc.essex.ac.uk/www.iota-six.co.uk/c/d5_variable_scope.asp>>, Iota-Six, pp. 1-5.

Watson, et al., "Design and implementation of the Trusted BSD MAC framework", Proceedings of 2003 DARPA Information Survivability Conference and Exposition, Sec. 1&5-7, Apr. 2003, pp. 38-49.

Pike et al., "Plan 9 from Bell Labs", Computing Systems, vol. 8, No. 3, Summer (Jun.) 1995, pp. 221-254, 22 pages.

* cited by examiner

PROCESS ISOLATION USING PROTECTION DOMAINS

RELATED APPLICATIONS

This application is a continuation-in-part of U.S. patent application Ser. No. 11/005,562, which was filed on Dec. 6, 2004 and is titled "Operating-System Process Construction", which is hereby incorporated by reference herein.

BACKGROUND

Modern computers are controlled by an operating system that executes computer programs as processes. Processes include a memory space as well as a set of instructions that can be executed by the processor of a computer. In order to enforce security and ensure that processes do not interfere with one another, hardware protection mechanisms such as privilege levels and virtual memory have been employed to isolate processes from one another.

Unfortunately, hardware protection mechanisms can be very costly in terms of execution time, reducing the performance of the processes. Therefore, it would be beneficial to have a way to maintain isolation of processes but also reduce the performance burden imposed by hardware protection mechanisms.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with certain aspects, a first plurality of operating system processes is assigned to a first protection domain, and a second plurality of operating system processes is assigned to a second protection domain. One or more hardware protection mechanisms are used to prevent the first plurality of operating system processes from accessing the memory space of the second plurality of operating system processes, and also to prevent the second plurality of operating system processes from accessing the memory space of the first plurality of operating system processes.

BRIEF DESCRIPTION OF THE DRAWINGS

The same numbers are used throughout the drawings to reference like features.

DETAILED DESCRIPTION

Figure 1:
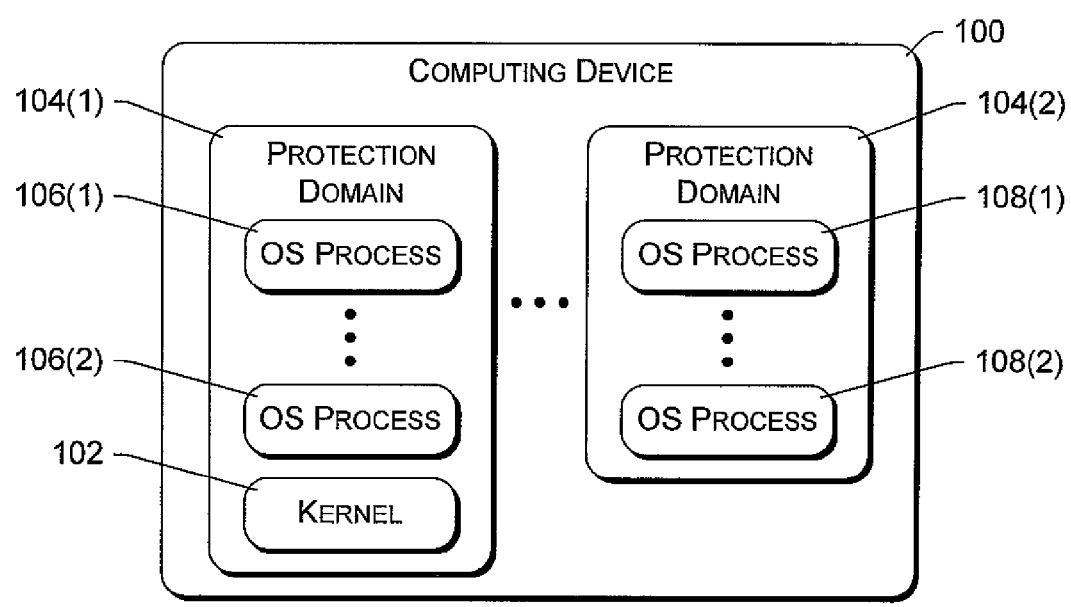
FIG. 1 illustrates an example computing device.

FIG. 1 illustrates an example computing device 100. Computing device 100 executes operating system processes grouped into one or more protection domains. Each protection domain can include one or more operating system processes. As illustrated in FIG. 1, computing device 100 includes one or more protection domains 104(1), . . . , 104(2). Protection domain 104(1) includes one or more processes 106(1), . . . , 106(2), and protection domain 104(2) includes one or more processes 108(1), . . . , 108(2).

One protection domain, shown as protection domain 104(1) in FIG. 1, includes an operating system kernel 102 that controls the execution of the operating system processes 106, 108 on device 100. One or more additional operating system processes can also be used to provide, in conjunction with kernel 102, operating system functionality for device 100. The protection domain 104(1) that includes kernel 102 can also be a kernel domain, as discussed in more detail below.

Each operating system process 106, 108, also referred to herein as a process, includes a memory space and a set of processor executable instructions. The memory space refers to one or more portions of memory that the instructions of the processor are to be stored in, run in, and are to access for data storage. These portions of memory are typically assigned by operating system kernel 102 to operating system processes 106, 108 as memory pages. The size of a memory page can vary based on operating system kernel 102 and the hardware (e.g., the processor) of computing device 100. In certain embodiments, each operating system process 106, 108 is a software isolated process (SIP), as discussed in more detail below.

Operating system processes 106, 108 can be controlled and managed individually by operating system kernel 102. Various information regarding the execution of each of the processes 106, 108 individually can be maintained by operating system kernel 102, such as the amount of processor time, memory, or other resource(s) that is used by the process; whether the process accessed a network, particular file(s), or other resource(s); the date and time when execution of the process began; and so forth. The operating system also maintains control over the individual processes and can terminate execution of a particular process whenever desired. The operating system can use any factors in determining to terminate execution of a particular process, such as if the operating system determines that the process is using too much of a particular resource, if the operating system believes that the process is malfunctioning, if the operating system believes the process has been running for too long, on user input, and so forth.

It should be noted that all of the operating system processes 106, 108 can be associated with the same user(s) or with different users, even though processes 106 are included in a different protection domain than processes 108. The process isolation discussed herein refers to isolating the processes from one another without regard for who the owner(s) of the process(es) are and without regard for any access control list constraints or other privilege restrictions of users in accessing a particular program, and so forth.

Operating system kernel 102 can employ both software protection and hardware protection mechanisms to isolate processes. Isolation of processes refers to allowing processes to access their own memory space but preventing them from accessing the memory space of other processes. This isolation provides security by preventing processes from interfering with the operation of other processes. This isolation also helps ensure that processes do not interfere with one another; the programmers that develop the programs that are run as processes can typically develop their programs without concern for the other processes that may be executing on the computing device at the same time.

Software protection refers to employing software mechanisms to isolate processes. In certain embodiments, the software protection refers to placing restrictions on the language that programs are written in, placing restrictions on the manner in which programs are compiled into executable instructions, and placing restrictions on the runtime environment in which the instructions are executed. All of these restrictions, when combined, result in processes that execute in their own memory space but do not access the memory space of other processes.

Hardware protection refers to employing features of the computing device, typically the processor of the computing device, to isolate processes. Where software protection relies on the manner in which the programs are written, compiled, and executed to ensure isolation, the hardware protection isolates processes even if the programs are not written, compiled, and executed to ensure isolation. In certain embodiments, the hardware protection refers to employing virtual memory and privilege level features of the processor executing the processes as discussed in more detail below.

Figure 2:
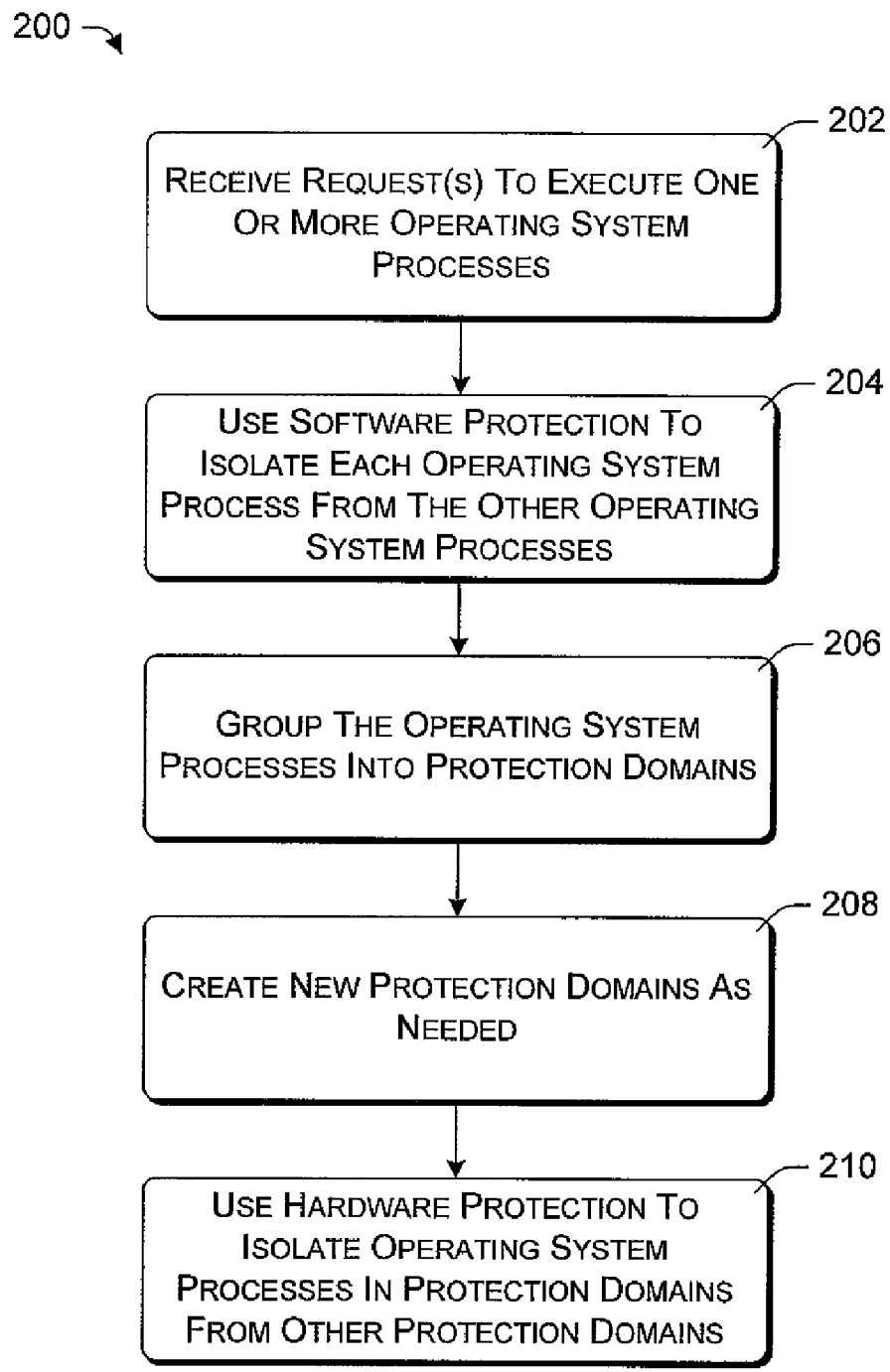
FIG. 2 illustrates an example process for isolating operating system processes.

FIG. 2 illustrates an example process 200 for isolating operating system processes. Process 200 can be carried out, for example, by operating system kernel 102 of FIG. 1, and may be implemented in software, firmware, hardware, or combinations thereof.

Initially, a request to execute one or more operating system processes is received (act 202). Requests to execute processes can be received, for example, as a result of a user input (e.g., user-selection of a program to be executed), as a result of a request from another operating system process that is executing, as a result of a request originating from part of the operating system, and so forth. Software protection can be used to isolate each operating system process from the other operating system processes (act 204). Software protection allows each operating system process, regardless of which protection domain it is part of, to be isolated from the other processes executing on the computing device. This isolation includes isolation from the other processes in its own protection domain as well as isolation from the processes in the other protection domains. Any of a variety of different software protection mechanisms can be used to implement the software protection in act 204. In certain embodiments, the software protection is implemented using software isolated processes (SIPs), as discussed in more detail below.

The operating system processes are grouped into different protection domains (act 206). Multiple protection domains can be used by the operating system, and multiple operating system processes can be included in each protection domain. The operating system can use any of a variety of different factors in determining which protection domain a particular operating system process is to be assigned to. For example, the user of the computing device that has requested execution of the process may also request a particular protection domain. The user may explicitly identify a particular protection domain, such as by requesting that the process execute in protection domain number 1. Alternatively, the user may implicitly identify a particular protection domain, such as by requesting that the process execute in the same protection domain as another executing process, in the same protection domain as other processes from the same manufacturer, and so on.

By way of another example, the operating system may have specific rules that specify which protection domains should include which operating system processes. Default rules can be included in the operating system, and may be altered by a system administrator or other user. Examples of such rules include: all processes from a particular manufacturer are to be included in the same protection domain, but that is a different protection domain than the processes from other manufacturers are included in; all new processes (e.g., from programs installed within the last month) are to be run in a separate protection domain; and so forth.

Situations can arise where a protection domain into which an operating system process(es) is to be grouped in act 206 does not yet exist. New protection domains are created for operating system processes as needed (act 208). Thus, whenever an operating system process is to be grouped into a protection domain that has not yet been created, that protection domain is created in act 208.

Additionally, hardware protection is used to isolate operating system processes in protection domains from other protection domains (act 210). This hardware protection in act 210 is in addition to the software protection in act 204. The hardware protection in act 210 operates as backup protection to the software protection in act 204. If there is a failure in or breach of the software protection, then operating system processes in different protection domains are still isolated from one another using the hardware protection in act 210.

Oftentimes, all the operating system processes executing on a device are protected using both software protection and hardware protection. However, situations can arise where only software protection or only hardware protection is used for at least some of the operating system processes. For example, a particular operating system process may be protected using hardware protection but not software protection, even though all the other operating system processes are being protected using both hardware protection and software protection.

Process 200 is performed at runtime. Typically, after receiving the request in act 202 to execute a process, the determination of which protection domain(s) to assign the process to is made prior to beginning execution of the process. Additionally, these determinations can change over time. For example, a process may be included in one protection domain one time it is executed, and, after execution has terminated, the process may be included in a different protection domain when it is subsequently executed regardless of whether the computing device on which the process is executing has been reset or restarted.

As discussed above, software protection refers to employing software mechanisms to isolate processes. In certain embodiments, the software protection is employed using a mechanism referred to as software isolated processes (SIPs). Additional information regarding SIPs and their construction can be found in the parent application (U.S. patent application Ser. No. 11/005,562), as well as U.S. patent application Ser. No. 11/007,655, which was filed on Dec. 7, 2004 and is titled "Inter-Process Communications Employing Bi-directional Message Conduits", which is hereby incorporated by reference herein, and U.S. patent application Ser. No. 11/007,808, which was filed on Dec. 7, 2004 and is titled "Self-Describing Artifacts and Application Abstractions", and which is also hereby incorporated by reference herein.

Software isolated processes make use of software verification, rather than hardware protection, to isolate processes. Software isolated processes rely on verifying safe behavior of code to prevent it from accessing another process's (or the kernel's) instructions or data. A verifiably safe program or process is one that can only access data that it allocated or was passed, and it cannot construct or corrupt a memory reference. Object allocation creates new references and occurs within a trusted runtime, which logically is an extension of the operating system kernel.

Software isolation makes use of two properties: type and memory safety. Type safety ensures that the only operations applied to a value (or area of memory containing a value) are those defined for instances of its type. Memory safety ensures the validity of memory references by preventing null pointer references, references outside an array's bounds, or references to deallocated memory. These properties can be partially verified by a compiler, but in some circumstances, such as dynamic array access, require runtime tests.

All untrusted code that runs in a SIP must be verifiably safe. The SIP may also contain trusted, unverified code that cannot be expressed in a safe language, for example, parts of the language runtime, a memory allocator, or an accessor for memory-mapped I/O. The correctness and safety of this type of code is verified by other means. A SIP is a closed object space that resides on a collection of memory pages exclusively owned by a process. An object space is the complete collection of objects reachable by a process at a point during its execution.

Software isolated processes ensure that two processes' objects spaces and memory spaces are always disjoint. Since the code in the processes is safe, the only way in which one process could obtain a reference to an object of another process is to be passed it. Software isolated processes prevent crossprocess references by not providing shared memory and by using the language type system to prevent a process from sending an object reference through the interprocess communication mechanism.

With software isolated processes, all interprocess communication occurs through messages passing across channels, which allows two processes to exchange data through an area of memory called the exchange heap. Messages in this heap are structs, not objects—they do not contain methods and cannot contain object references. Messages, however, can contain references to exchange heap data, so it is possible to send structured data between processes. However, an object reference cannot be embedded in a message or sent between processes. Moreover, the system maintains the invariant that there exists at most one pointer to an item in the exchange heap. When a process sends a message, it loses its reference to the message, which is transferred to the receiving process (analogous to sending a letter by postal mail). Therefore, processes cannot use this heap as shared memory and messages can be exchanged through pointer passing, not copying.

Hardware protection, as discussed above, refers to employing features of the computing device, typically the processor of the computing device, to isolate processes. In certain embodiments, the hardware protection refers to employing virtual memory and privilege level features of the processor of the computing device executing the processes (e.g., a processor of computing device 100 of FIG. 1).

Figure 3:
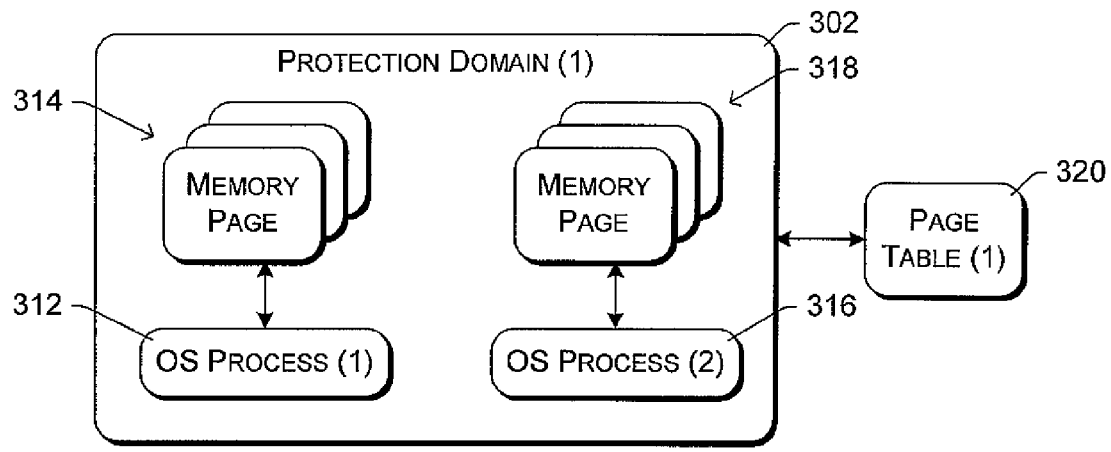
FIG. 3 illustrates an example of the usage of hardware protection.
Figure 3:
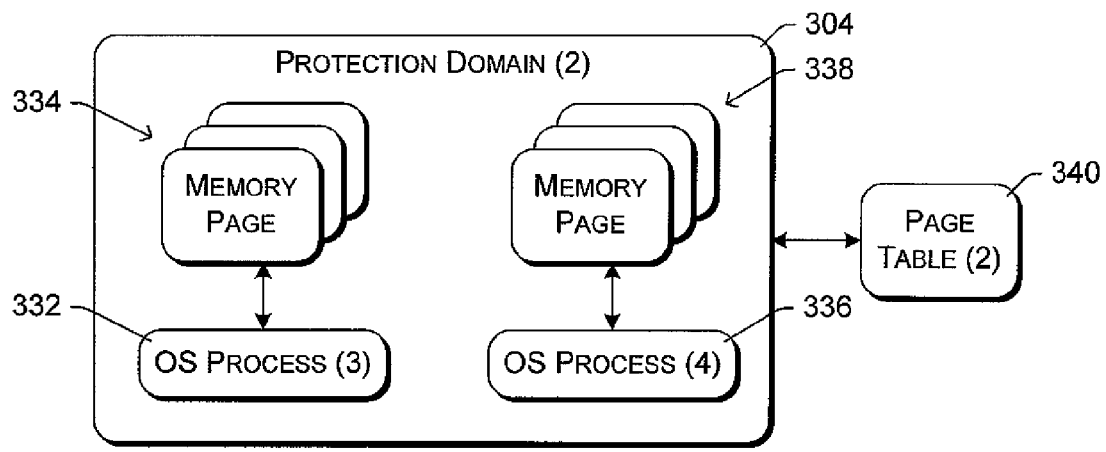

FIG. 3 illustrates an example of the usage of hardware protection. In FIG. 3, virtual memory is used as a hardware protection mechanism. With virtual memory, virtual address spaces are assigned to each protection domain. The operating system maintains a mapping of virtual addresses to physical memory addresses for each protection domain, and uses this mapping when an operating system process of the protection domain is executing. The operating system processes use the virtual address space, unaware of the actual physical memory space that it corresponds to. In this use of virtual memory, the operating system takes care that, except for kernel memory, each given physical memory page is used by at most one virtual address space.

In the example of FIG. 3, two protection domains 302 and 304 are illustrated. Protection domain 302 includes an operating system process 312 that includes one or more memory pages 314. The memory pages 314 are also referred to as the memory space, or the memory of process 312. Protection domain 302 also includes an operating system process 316 that includes one or more memory pages 318. The memory pages 318 are also referred to as the memory space, or the memory of process 316.

The operating system also maintains a page table 320 that identifies the memory pages that are accessible by protection domain 302. Page table 320 is used by the processor during execution of the operating system and the operating system processes when requests are made to access memory. If a request is made by operating system process 312 or 316 to access a memory location that is not on a memory page identified in page table 320, then the processor will not permit the memory location to be accessed. If a memory location appears in table 320, the operating system ensures that it does not appear in any other table (except for kernel memory), ensuring that the memory used by protection domain 302 is not accessible by processes in any other protection domain.

Similarly, protection domain 304 includes an operating system process 332 that includes one or more memory pages 334. The memory pages 334 are also referred to as the memory space, or the memory of process 332. Protection domain 304 also includes an operating system process 336 that includes one or more memory pages 338. The memory pages 338 are also referred to as the memory space, or the memory of process 336.

The operating system also maintains a page table 340 that identifies the memory pages that are accessible by protection domain 304. Page table 340 is used by the processor during execution of the operating system and the operating system processes when requests are made to access memory. If a request is made by operating system process 332 or 336 to access a memory location that is not on a memory page identified in page table 340, then the processor will not permit the memory location to be accessed. If a memory location appears in table 340, the operating system ensures that it does not appear in any other table (except for kernel memory), ensuring that the memory used by protection domain 304 is not accessible by processes in any other protection domain.

Typically, at any given time, the processor (or a core of a processor in situations where the processor includes multiple cores) executes only one process at a time. When the processor switches to execute a different process, the processor loads the page table for the protection domain that the new process is assigned to. If the new process is in the same protection domain as the previously running process, then the same page table can be used and need not be re-loaded.

Thus, the use of virtual memory allows operating system processes to be isolated using hardware. The processor executing the operating system processes prohibits each operating system process from accessing any memory locations that are not assigned to the same protection domain as the operating system process. The operating system ensures that, except for kernel memory, each memory location is assigned to at most one protection domain.

The hardware protection can also make use of privilege level features of the processor of the computing device executing the processes. The privilege level features of the processor refer to features that allow different processes to be executed at different privilege levels. These different levels may be referred to as different rings (e.g., Ring 0 and Ring 3 in x86 architecture processors), supervisor mode and user mode, and so forth. Regardless of the nomenclature used, the privilege features allow certain processes to be executed at a more-privileged level (e.g., Ring 0 or supervisor mode), and others to be executed at a less-privileged level (e.g., Ring 3 or user mode).

Processes executing at the less-privileged level are not permitted to directly access any code or methods of the processes running at the more-privileged level. The processes executing at the less-privileged level are prohibited by the processor from accessing any of the memory pages of the processes running at the more-privileged levels. Rather, the processor includes instructions that can be invoked by a less-privileged level process to cause the processor to switch to running the more-privileged process in order to allow the code desired by the less-privileged process to be executed.

The operating system kernel executes at the more-privileged level. The operating system maintains an attribute for each protection domain that indicates whether the protection domain is a kernel domain. Multiple protection domains can be kernel domains. Kernel memory, which refers to the memory pages used by the processes executing in the kernel domain, is always mapped in the page tables used by the processor (e.g., page tables 320 and 340 of FIG. 3).

All processes in a kernel domain execute at the same processor privilege level as the kernel, whereas all other processes execute at a less-privileged level than the kernel. This allows all processes executing in the kernel domain to invoke and communicate with the kernel faster than if they were not in the kernel domain, but also allows those processes to corrupt, if they circumvent software protection, the kernel and the rest of the system as they can access the memory pages of the kernel and the virtual memory functionality of the processor. Each memory page of the kernel domain is marked (e.g., in page table 320 or page table 340 of FIG. 3) as being inaccessible to less-privileged level processes. Any processes running at the less-privileged level can invoke the proper instructions for the processor to switch to running a process in the kernel domain, but are not able to access the memory pages of the kernel domain. Additionally, the processor typically prevents any process operating at the less-privileged level from accessing the virtual memory features of the processor, thereby preventing the processes operating at the less-privileged level from circumventing the memory isolation achieved by the use of virtual memory. Thus, the processor privilege levels add an additional level of hardware protection between those processes executing at the less-privileged level and the operating system kernel.

It should be noted that, as multiple protection domains can be kernel domains, situations can arise where all processes are executing in the kernel domain. In such situations, some or all of the hardware protection features of the processor can be disabled. For example, the privilege level features of the processor can be disabled and/or the virtual memory features of the processor can be disabled.

As discussed above, messages between operating system processes are passed by exchanging data through an area of memory referred to as an exchange heap. Messages in the exchange heap do not contain methods and cannot contain object references, but can contain references to exchange heap data. So, it is possible to send data between processes using the exchange heap. At most one pointer to an item in the exchange heap exists at any one time. When a process sends a message, the process loses its reference to the message, but the receiving process obtains the reference to the message.

Each protection domain has its own exchange heap which is used by operating system processes within that protection domain to pass messages. In certain embodiments, a single kernel exchange heap exists, and all kernel domains use this single kernel exchange heap to pass messages.

As each protection domain has its own exchange heap, additional steps are taken to pass messages between operating system processes that are in different protection domains. To send a message to an operating system process in another protection domain, the sending process writes the data into a structure in the exchange heap of its protection domain. The sending process then invokes the kernel to request that this data and any other data in the exchange heap that it references be marshaled and copied to the target protection domain. The kernel marshals the data by first copying the data into the kernel exchange heap and deallocating the memory from the exchange heap of the protection domain of the sending process. The kernel then copies the data from the kernel exchange heap into a structure in the exchange heap of the target protection domain.

In certain embodiments, the operating system maintains a record of the memory blocks that are allocated for each exchange heap. This record is maintained separately from the actual data of the exchange heap blocks. To maintain the integrity of this record, only processes in the kernel domain can write data to this record.

In certain embodiments, such as current x86 architecture processors, the operating system specifies virtual to physical mapping with a tree of mapping descriptors rooted at a processor control register. This control register can only be accessed by more-privileged processes. The structure of the tree is dictated by the processor and can vary according to the memory management unit (MMU) features of the processor that are enabled. The mapping descriptors are arranged in a three-tiered tree. The root node contains four, 64-bit entries, each spanning 1 GB of virtual memory. A second-tier node occupies one 4 KB memory page and contains 512 64-bit entries, each of which spans 2 MB of virtual memory. Entries in the root and second-tier nodes contain the physical address of their child node. A leaf node contains 512 64-bit entries, each of which is the physical address of an individual 4 KB memory page. Every entry also contains a variety of control bits.

When virtual memory is used, an address manipulated by a process is virtual; at execution time, it is translated to a physical RAM address. When executing any instruction that references memory, the processor translates a virtual address by using its most significant 2 bits as an index into the root node of memory-mapping descriptor tree. The selected entry points to second-tier node, which is indexed by the 3rd through 12th most significant bits of the virtual address. The next 9 bits are used as an index into a leaf node. The least-significant 12 bits of the virtual address are an offset into the 4 KB memory page indicated the leaf node.

Because a complete mapping tree would occupy 8 MB of physical RAM, a control bit in every entry indicates the entry's validity. When this bit is cleared, the entry indicates that no physical memory is mapped to its corresponding range of virtual memory. Accessing memory in an unmapped range raises a processor page fault exception. Performing this translation process at every memory reference is impractical, so a Translation Lookaside Buffer (TLB) caches virtual-to-physical memory mappings. On current x86 processors, the operating system explicitly invalidates TLB entries when it updates memory mappings, as the TLB is not automatically updated or flushed. Reloading the memory-mapping control register (which specifies the root memory-mapping descriptor node) implicitly invalidates the entire TLB.

Figure 4:
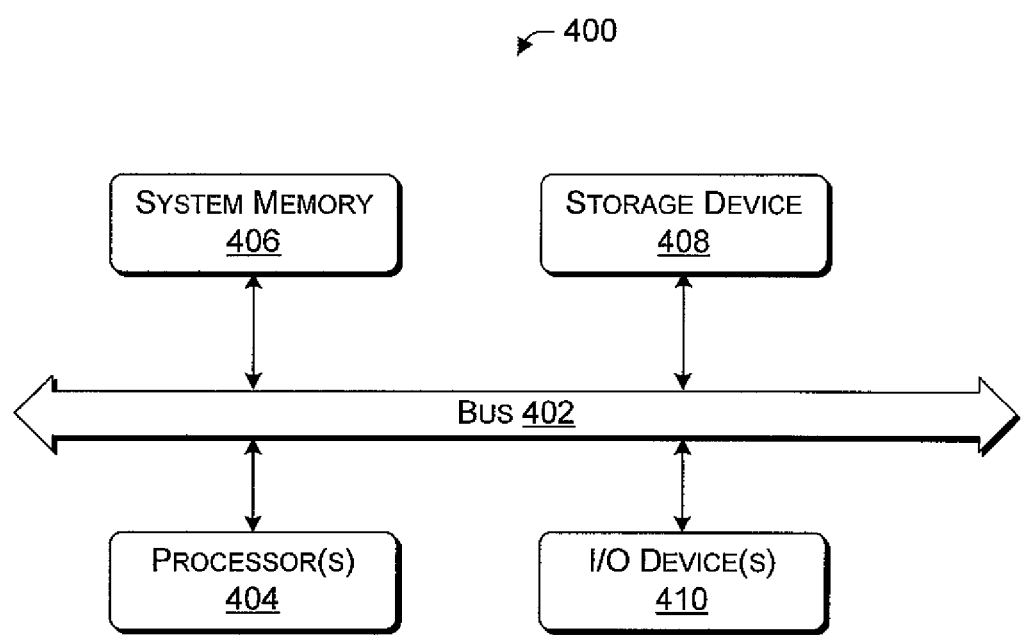
FIG. 4 illustrates an example of a general computing device that can be used to implement the process isolation using protection domains discussed herein.

FIG. 4 illustrates an example of a general computing device 400 that can be used to implement the process isolation using protection domains discussed herein. Computing device 400 can be a device 100 of FIG. 1. Computing device 400 is only one example of a computing device and is not intended to suggest any limitation as to the scope of use or functionality of the computing device and network architectures. Neither should computing device 400 be interpreted as having any requirement regarding the inclusion (or exclusion) of any components or the coupling or combination of components illustrated in the example computing device 400.

Computing device 400 is a general-purpose computing device that can include, but is not limited to, one or more processors or processing units 404, a system memory 406, and a bus 402 that couples various system components including the processor 404 to the system memory 406.

Bus 402 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

System memory 406 includes computer readable media in the form of volatile memory, such as random access memory (RAM), and/or non-volatile memory, such as read only memory (ROM) 412.

Computing device 400 may also include other removable/non-removable, volatile/non-volatile computer storage device 408. By way of example, storage device 408 may be one or more of a hard disk drive for reading from and writing to a non-removable, non-volatile magnetic media, a magnetic disk drive for reading from and writing to a removable, non-volatile magnetic disk (e.g., a "floppy disk"), an optical disk drive for reading from and/or writing to a removable, non-volatile optical disk such as a CD, DVD, or other optical media, a flash memory device, and so forth. These storage device(s) and their associated computer-readable media provide storage of computer readable instructions, data structures, program modules, and/or other data for computing device 400.

User commands and other information can be entered into computing device 400 via one or more input/output (I/O) devices 410, such as a keyboard, a pointing device (e.g., a "mouse"), a microphone, a joystick, a game pad, a satellite dish, a serial port, a universal serial bus (USB), a IEEE 1394 bus, a scanner, a network interface or adapter, a modem, and so forth. Information and data can also be output by computing device 400 via one or more I/O devices 410, such as a monitor, a printer, a network interface or adapter, a modem, a speaker, and so forth.

An implementation of the process isolation using protection domains described herein may be described in the general context of processor-executable instructions or computer-executable instructions, such as program modules, executed by one or more computing devices. Generally, program modules include routines, programs, objects, components, data structures, etc. that perform particular tasks or implement particular abstract data types. Typically, the functionality of the program modules may be combined or distributed as desired in various embodiments.

An implementation of the process isolation using protection domains may be stored on or transmitted across some form of computer readable media. Computer readable media or processor-readable media can be any available media that can be accessed by a computer. By way of example, and not limitation, computer readable media or processor readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Alternatively, all or portions of these modules and techniques may be implemented in hardware or a combination of hardware, software, and/or firmware. For example, one or more application specific integrated circuits (ASICs) or programmable logic devices (PLDs) could be designed or programmed to implement one or more portions of the framework.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method of isolating a plurality of operating system processes on a particular processor, the method comprising:

using software protection for at least two of the operating system processes to prevent each of the at least two operating system processes from accessing memory assigned to the other of the at least two operating system processes and to other processes of the plurality of operating system processes;

grouping the plurality of operating system processes into a plurality of protection domains, each of the at least two operating system processes being grouped into a different protection domain; and using hardware protection to prevent one of the at least two operating system processes from accessing memory assigned to another operating system process belonging to a different protection domain from the one of the at least two operating system processes, the hardware protection operating as backup protection to the software protection.

2. A method as recited in claim 1, the hardware protection comprising assigning one of the protection domains a more-privileged processor privilege level than is assigned to other protection domains that include one or more of other processes of the plurality of operating system processes, wherein a processor executing the plurality of operating system processes prevents the one or more of the other processes from accessing memory assigned to the one of the at least two operating system processes in the protection domain, and further prevents the one or more of the other processes from accessing virtual memory features of the processor.

3. A method as recited in claim 1, the hardware protection of the processor comprising using virtual memory to isolate one or more address spaces of the protection domains from address spaces of other protection domains.

4. A method as recited in claim 1, wherein an operating system that controls execution of the plurality of operating system processes can terminate execution of each of the plurality of operating system processes individually.

5. A method as recited in claim 1, further comprising accessing a set of rules specifying which protection domains should include which operating system processes in order to identify the processes to be grouped into the protection domains.

6. A method as recited in claim 1, the using hardware protection of the processor comprising:
   identifying a first protection domain as a kernel domain;
   identifying a second protection domain as the kernel domain; and
   identifying a third protection domain as not the kernel domain.

7. A method as recited in claim 1, wherein one of the protection domains is a kernel domain, and wherein each of the plurality of operating system processes is a software isolated process (SIP) having software protection.

8. A method as recited in claim 1, further comprising using the hardware protection to prevent an additional process from accessing memory assigned to the plurality of operating system processes on the processor without using the software protection to prevent the additional process from accessing memory assigned to the plurality of operating system processes.

9. A method as recited in claim 1, the software protection comprising allowing the at least two operating system processes to exchange data through an area of memory belonging to neither of the at least two operating system processes and allowing only one of the at least two operating system processes to reference a data structure corresponding to a message at a time.

10. One or more computer readable media having stored thereon a plurality of instructions that, when executed by a particular processor, causes the processor to:
   use software protection for at least two of the operating system processes to prevent each of the at least two operating system processes from accessing memory assigned to the other of the at least two operating system processes and to other processes of the plurality of operating system processes;
   group the plurality of operating system processes into a plurality of protection domains, one of the at least two operating system processes being grouped into a first protection domain and the other of the at least two operating system processes being grouped into a second protection domain; and
   use hardware protection to prevent the one of the at least two operating system processes from accessing memory assigned to another operating system process belonging to a different protection domain from the first protection domain, the hardware protection operating as backup protection to the software protection,
   wherein the hardware protection includes a page table associated with the first protection domain that identifies memory pages that are accessible by the operating system processes of the first protection domain.

11. One or more computer readable media as recited in claim 10, wherein the software protection includes preventing null pointers, references outside an array's bounds, and references to deallocated memory.

12. One or more computer readable media as recited in claim 10, the hardware protection comprising assigning the first protection domain a more-privileged processor privilege level than the second protection domain, wherein a processor prevents operating system processes of the second protection domain from accessing the memory space of operating system processes of the first protection domain and further prevents the operating system processes of the second protection domain from accessing virtual memory features of the processor.

13. One or more computer readable media as recited in claim 10, the hardware protection comprising identifying the first protection domain and the second protection domain as kernel domains, identifying a third protection domain to which is assigned a third plurality of operating system processes, and identifying the third protection domain as not a kernel domain.

14. One or more computer readable media as recited in claim 10, the hardware protection comprising using virtual memory to isolate a virtual address space of the first protection domain from a virtual address space of the second protection domain.

15. One or more computer readable media as recited in claim 10, wherein which operating system processes are to be assigned to the first protection domain and which operating system processes are to be assigned to the second protection domain changes over time.

16. One or more computer readable media as recited in claim 10, wherein the page table is loaded when an operating system process of the first protection domain is executed.

17. A computing device comprising:
   a processor; and
   a memory, coupled to the processor, the memory storing a plurality of instructions that, when executed by the processor, cause the processor to isolate a plurality of operating system processes on the processor from each other by:
     using software protection for at least two of the operating system processes to prevent each of the at least two operating system processes from accessing memory assigned to the other of the at least two operating system processes and to other processes of the plurality of operating system processes, the software protection further including preventing null pointers, references outside an array's bounds, or references to deallocated memory;
     grouping the plurality of operating system processes into a plurality of protection domains, each of the at least two operating system processes being grouped into a different protection domain; and
     using hardware protection to prevent one of the at least two operating system processes from accessing memory assigned to another operating system process belonging to a different protection domain from the one of the at least two operating system processes, the hardware protection operating as backup protection to the software protection,
   wherein the hardware protection includes a page table associated with the protection domain having the one of the at least two processes, that protection domain identifying memory pages that are accessible by the operating system processes of that protection domain.

18. A computing device as recited in claim 17, the hardware protection comprising assigning a first protection domain a more-privileged processor privilege level than is assigned to one or more other protection domains, wherein a processor prevents one or more other processes of the other protection domains from accessing memory spaces of one or more processes in the first protection domain and further prevents the one or more other processes from accessing virtual memory features of the processor.

19. A computing device as recited in claim 17, the hardware protection comprising using virtual memory to isolate a virtual address space of a first protection domain from one or more virtual address spaces of other protection domains.

20. A computing device as recited in claim 19, the hardware protection further comprising using processor privilege levels to prevent other processes of the plurality of operating system processes from circumventing the virtual memory.

* * * * *